(12) United States Patent
Kodama et al.

(10) Patent No.: US 7,378,183 B2
(45) Date of Patent: May 27, 2008

(54) SEALED CELL USING FILM OUTER CASING BODY

(75) Inventors: Yasunobu Kodama, Sumoto (JP); Tomohiko Yokoyama, Kobe (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 627 days.

(21) Appl. No.: 10/949,200

(22) Filed: Sep. 27, 2004

(65) Prior Publication Data

US 2005/0069764 A1    Mar. 31, 2005

(30) Foreign Application Priority Data

Sep. 30, 2003    (JP) .............................. 2003-339588

(51) Int. Cl.
*H01M 4/00* (2006.01)
(52) U.S. Cl. .................. 429/94; 429/185; 429/162; 429/176
(58) Field of Classification Search .............. 429/94, 429/129, 162, 163, 133, 136, 185, 176
See application file for complete search history.

(56) References Cited

U.S. PATENT DOCUMENTS

2003/0099880 A1    5/2003    Park et al. .................. 429/211

FOREIGN PATENT DOCUMENTS

| JP | 2000-285902 |   | 10/2000 |
|----|-------------|---|---------|
| JP | 2001-176463 | * | 6/2001  |
| JP | 2002-042881 |   | 8/2002  |
| JP | 2002-289257 | * | 10/2002 |
| JP | 2002-198098 |   | 12/2002 |
| JP | 2003-168417 |   | 6/2003  |

* cited by examiner

*Primary Examiner*—Raymond Alejandro
(74) *Attorney, Agent, or Firm*—Westerman, Hattori, Daniels & Adrian, LLP.

(57) ABSTRACT

A sealed cell with a film outer casing body having a flat electrode body is prevented from short circuiting damage due to impacts. The flat electrode body has first and second electrodes and a separator therebetween, which are wound into a flat shape having first and second flat side surface R portions. The first electrode is the outermost surface of the electrode body. An insulation film is provided between the outermost portion of the first electrode and a portion of the second electrode immediately inside the outermost portion, and between the portion of the second electrode and another portion of the first electrode immediately inside the portion of the second electrode.

9 Claims, 9 Drawing Sheets

Fig. 3 first side surface R portion second side surface R portion

Fig. 4 a) inner side surface b) outer side surface

Fig. 5 a) inner side surface b) outer side surface

Fig. 6 a) inner side surface b) outer side surface

SEALED CELL USING FILM OUTER CASING BODY

BACKGROUND OF THE INVENTION

1) Field of the Invention

The present invention relates to a cell using a film outer casing body for the cell case.

2) Description of the Prior Art

In recent years, there has been a rapid reduction in the size of mobile electronic devices such as mobile telephones and PDAs. Further reduction in thickness and weight is accordingly required of cells and batteries that serve as the driving power sources of such devices.

To meet this demand, light-weight thin cells have been developed utilizing, as the cell cases, film outer casing bodies made of a laminate film that is a lamination of resin and a metal foil such as aluminum.

The film outer casing bodies excel in thinness, flexibility, and lightness, but have the problem of easiness for deformation upon application of external force. External impacts can easily travel through the internal cell. Thus, the cells using the film outer casing bodies can be problematic in that the electrode body is easily damaged by the shock of, say, inadvertent drop, and that the damage of the electrode body often causes internal short-circuiting.

SUMMARY OF THE INVENTION

It is an object of the present invention to provide a cell structure that prevents internal short-circuiting caused by external impacts, in a cell using a film outer casing body made of an aluminum laminate material or the like.

The present inventors conducted an extensive study on internal short-circuiting in film outer casing body cells that house flat electrode bodies. As a result of this study, the cause of internal short-circuiting has been detected. When the film outer casing body cell that houses the flat electrode body receives an impact from, for example, dropping, one of the four corners of the flat electrode body is severely deformed. The four corners of the flat electrode body correspond to the upper and lower edges of the two flat side surface R portions of the electrode body. The deformation causes to break a portion of the separator situated in the flat side surface R portions, which result in internal short-circuiting. The present invention has been completed based on this finding.

A first aspect of the present invention is configured as follows.

A sealed cell using a film outer casing body comprising: a flat-shaped electrode body having a first electrode and a second electrode opposed to the first electrode via a separator, the first electrode and the second electrode and the separator wound into a flat shape, the flat shape having a first flat side surface R portion and a second flat side surface R portion; the film outer casing body for housing the flat-shaped electrode body; and an electrolyte, the sealed cell wherein: a portion of the first electrode is an outermost surface of the flat-shaped electrode body; and a first insulation member for completely covering a lower edge and/or an upper edge of the first flat side surface R portion is provided between the outermost portion of the first electrode and a portion of the second electrode wound immediately inside the outermost portion of the first electrode, and another first insulation member is provided between the portion of the second electrode immediately inside the outermost portion of the first electrode and another portion of the first electrode wound immediately inside the portion of the second electrode immediately inside the outermost portion of the first electrode.

It should be noted that the terms "lower edge" and "upper edge" of the flat side surface R portion do not mean the literal lower and upper edges of the flat side surface R portion, but mean a substantial area including each of the lower and upper edges.

A second aspect of the present invention is configured as follows. In the first aspect, the film outer casing body has a flat-shaped three-side-sealed structure composed of a square aluminum laminate film, the square aluminum laminate film folded and three sides of the folded aluminum laminate film sealed, the aluminum laminate film being a lamination of an aluminum layer and a resin layer; and the lower edge of the first flat side surface R portion is arranged in a bottom portion of the film outer casing body, the lower edge alone provided with the first insulation members.

A third aspect of the present invention is configured as follows. In the first aspect, the first electrode is smaller than the second electrode in width; and the first insulation member is provided on an inner surface of the outermost portion of the first electrode, and the another insulation member is provided on an outer surface of the another portion of the first electrode immediately inside the portion of the second electrode immediately inside the outermost portion of the first electrode.

A fourth aspect of the present invention is configured as follows. In the first aspect, a second insulation member is provided on the outermost portion of the first electrode, the second insulation member completely covering the second flat side surface R portion.

A fifth aspect of the present invention is configured as follows. In the fourth aspect, a winding end of the first electrode is arranged in the second flat side surface R portion in the outermost surface of the electrode body; and the second insulation member is an insulation winding-end tape for taping a winding end of the electrode body.

The present invention provides the following advantageous effects.

Since the flexibility of the film outer casing body causes easy deformation upon application of external force, the electrode body inside the cell using the film outer casing body is adversely affected by external pressure or impacts. Especially vulnerable in the electrode body are the edges of the flat side surface R portion, which include the corners and thus often suffer internal short-circuiting. In view of this, the present invention has at least one of the upper and lower edges of the flat side surface R portion of the electrode body completely covered by an insulation member. This is accomplished by providing the insulation member between a portion of the first electrode that is wound to be the outermost surface of the electrode body and a portion of the second electrode that is wound to be immediately inside the outermost portion of the first electrode, and between the portion of the second electrode and another portion of the first electrode that is wound to be immediately inside the portion of the second electrode. Even if the edges of the flat side surface R portion is deformed or broken by impacts from, for example, dropping, the insulation member securely prevents the contact of the first and second electrodes at least in one of the upper and lower edges of the first flat side surface R portion. Specifically, the insulation member prevents the contact of the outermost portion of the first electrode and the portion of the second electrode immediately inside the outermost portion of the first electrode, and prevents the contact of the portion of the second electrode and the another portion of the first electrode immediately inside the portion of the second electrode. As a result, short-circuiting is hard to occur. Thus, the present invention significantly improves the credibility (drop impact resistance) of the cell that uses the film outer casing body.

In the second aspect, the insulation member is provided only on the lower edge of the first flat side surface R portion that is arranged in the bottom portion of the film outer casing body. This structure requires only a small amount of the insulation member in improving the drop impact resistance. Cells using an aluminum laminate film outer casing body of the three-side-sealed structure are weak in strength especially in the bottom portions. The provision of the insulation member in the bottom portions and not in the rest portions practically improves the drop impact resistance with a minimum amount of the insulation member, which is why the insulation member comes in a small amount.

In the third aspect, the first electrode is smaller than the second electrode in width; and the insulation member is provided on an inner surface of the outermost portion of the first electrode, and on an outer surface of the another portion of the first electrode immediately inside the portion of the second electrode immediately inside the outermost portion of the first electrode. With this structure, the tolerance encountered in preparing the substrate for the first electrode is smaller than that in preparing the substrate for the second electrode. This structure also reduces dislocated winding. Thus, the insulation member securely covers the portions of the electrodes corresponding to the edges of the flat side surface R portion. As a result, there is an improved yield of cell production.

Another aspect, in which the insulation member is provided to completely cover the first flat side surface R portion, enables one insulation tape to cover the both edges of the flat side surface R portion, that is, one surface of the electrode in the flat side surface R portion is covered by one insulation tape. This simplifies the cell production process, as compared with the case where two insulation tapes are respectively provided on the both edges of the flat side surface R portion.

The fourth aspect, in which the second insulation member is provided on the outermost portion of the first electrode to completely cover the second flat side surface R portion, further securely prevents internal short-circuiting caused by deformed edges of the second flat side surface R portion resulting from dropping impacts. This further improves the drop impact resistance of the sealed cell that uses the film outer casing body.

In the fifth aspect, the winding end of the first electrode is arranged in the second flat side surface R portion of the outermost surface of the electrode body; and the second insulation member is an insulation winding-end tape for taping the winding end of the electrode body. This structure reduces the amount of the winding-end tapes and the number of members required in cell production.

DESCRIPTION OF THE PREFERRED EMBODIMENTS

The present invention as applied to a polymer lithium ion secondary cell will be described with reference to the drawings.

Figure 1:
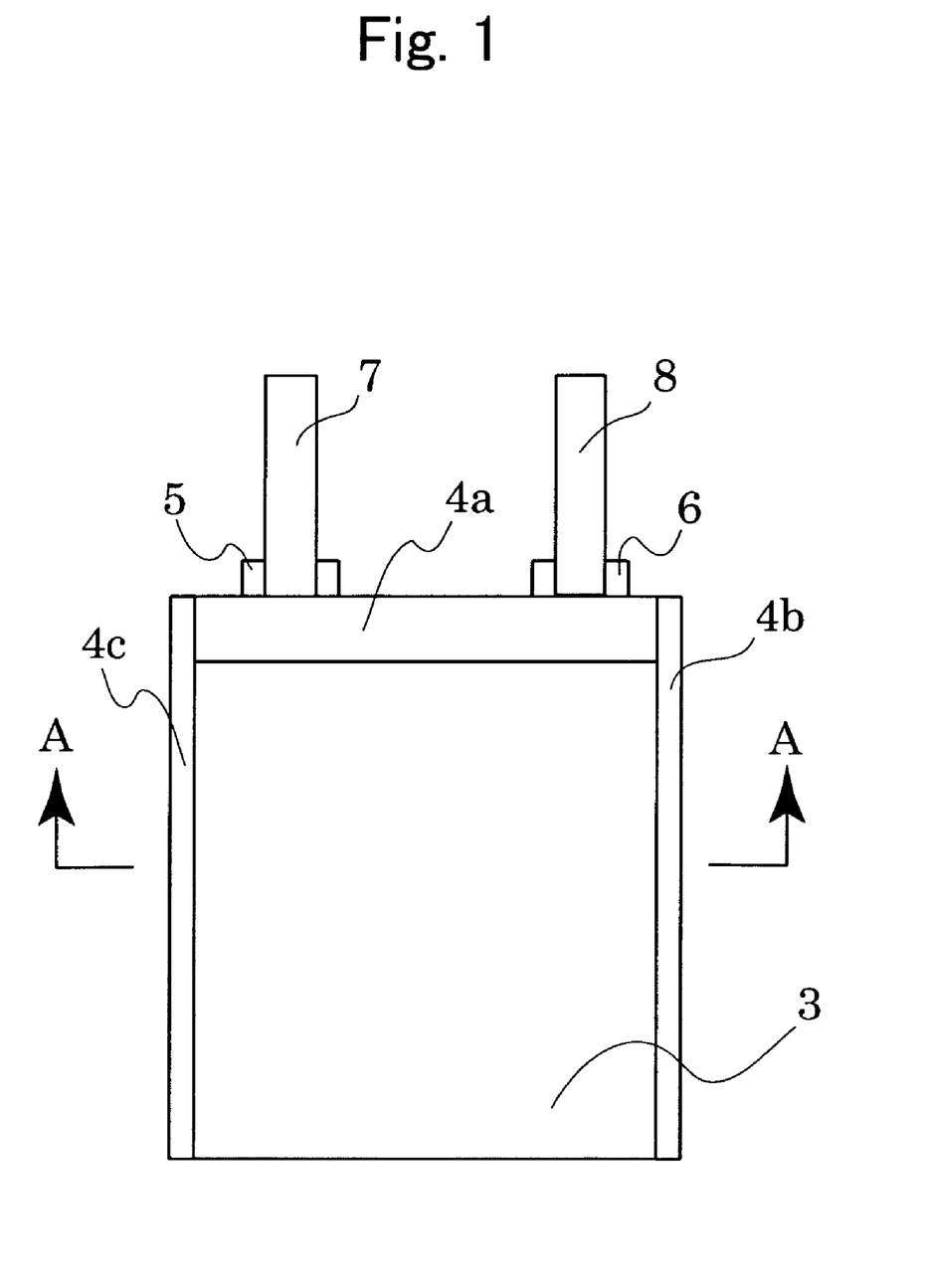
FIG. 1 is a front view of a sealed cell using a film outer casing body of the present invention.
Figure 2:
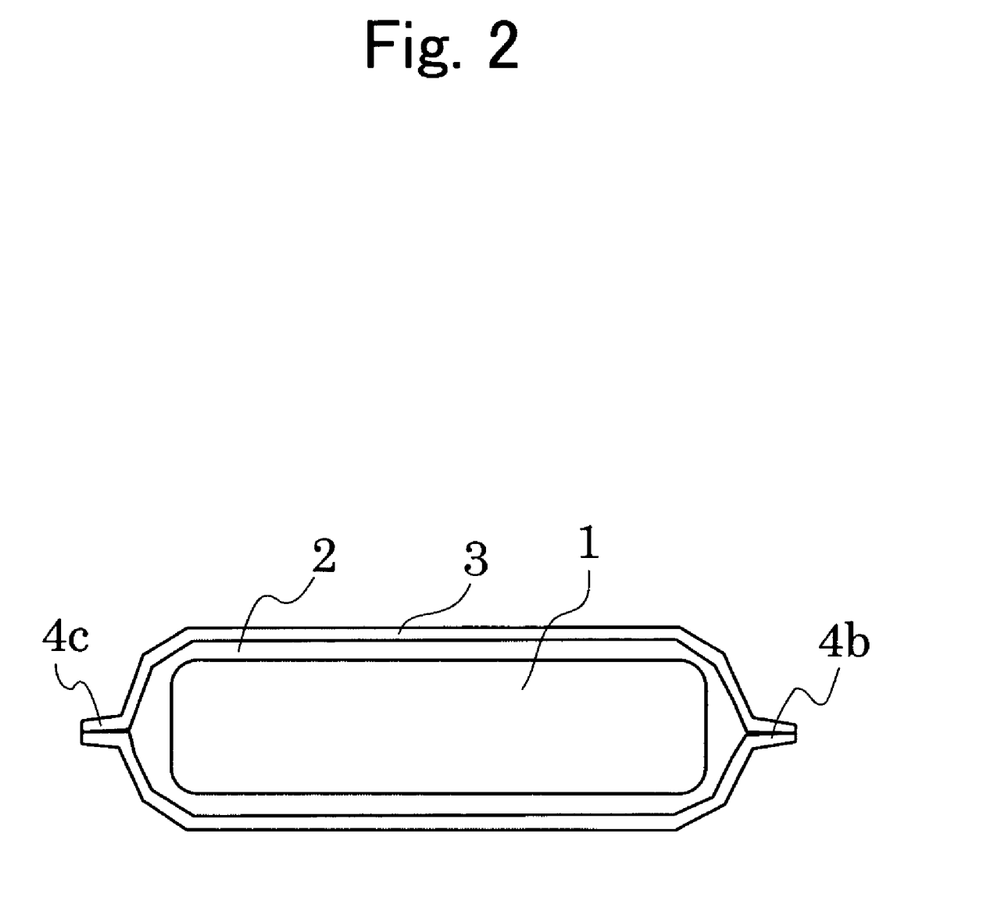
FIG. 2 is a sectional view of the cell taken along the line A-A shown in FIG. 1.
Figure 3:
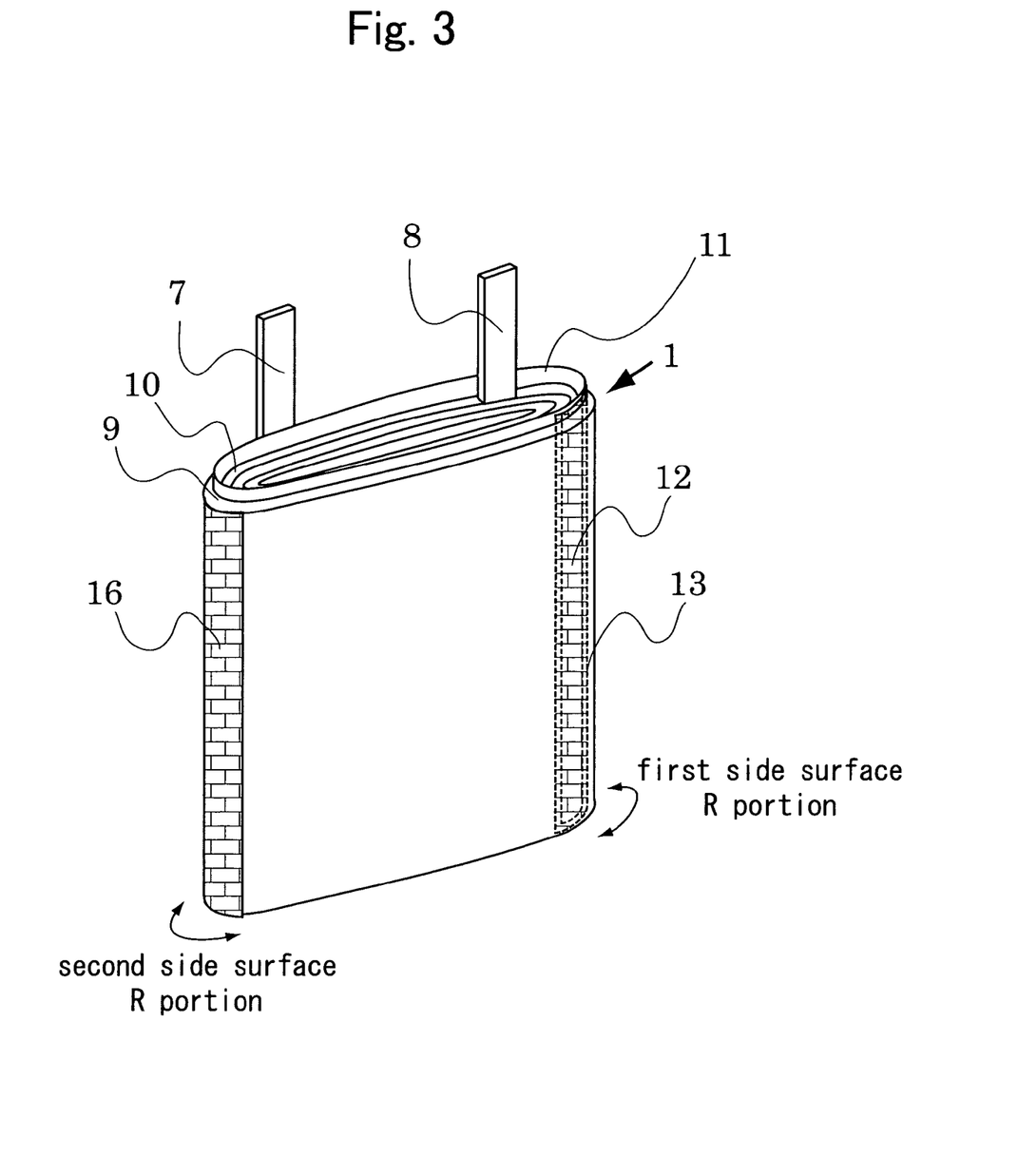
FIG. 3 is a perspective view of an electrode body of the present invention.

Referring to FIGS. 1 and 2, the polymer lithium ion secondary cell of the present invention includes an aluminum laminate outer casing body 3 that uses an aluminum laminate material, which is an example of the film outer casing body. As shown in FIG. 1, the aluminum laminate outer casing body 3 is of a three-side-sealed structure having a bottom portion and peripheral sealed portions 4a, 4b, and 4c. The bottom portion is the folded portion resulting from folding the film in half, and the peripheral sealed portions are for sealing the three opening sides. The three opening sides of the resulting flat product are sealed to result in the three-side-sealed structure. The resulting main body includes a storage space 2 (see FIG. 2) surrounded by the bottom portion and the three side sealed portions 4a, 4b, and 4c. Housed in the storage space 2 are a flat electrode body 1 that has a first flat side surface R portion and a second flat side surface R portion, as shown in FIG. 3, and a gelled polymer that includes a non-aqueous electrolyte.

Figure 7:
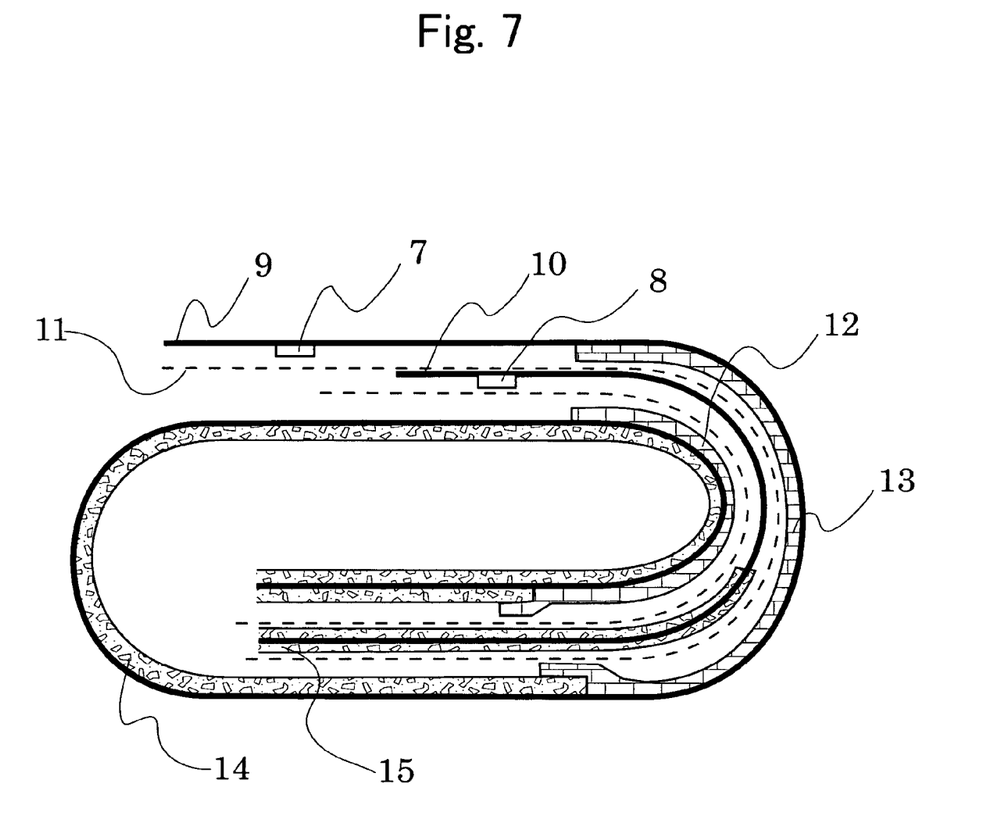
FIG. 7 is a sectional view of an example of the electrode body of the present invention.

A further description on the flat electrode body 1 will be given. The flat electrode body 1 has a positive electrode 9 serving as a first electrode, a negative electrode 10 serving as a second electrode, and a separator 11 that separates the electrodes. These three portions are wound together into a flat wound shape with the positive electrode 9 (first electrode) wound to be the outermost surface of the flat electrode body 1. As shown in FIGS. 3 and 7, an insulation member 13 is provided between the outermost portion of the positive electrode and a portion of the negative electrode (second electrode) wound to be immediately inside the outermost portion of the positive electrode, and an insulation member 12 is provided between the portion of the negative electrode immediately inside the outermost portion of the positive electrode and another portion of the positive electrode wound immediately inside the portion of the negative electrode immediately inside the outermost portion of the positive electrode. The provision of the insulation members 12 and 13 is such that the insulation members 12 and 13 completely cover at least one of the lower and upper edges of the first flat side surface R portion.

Figure 4:
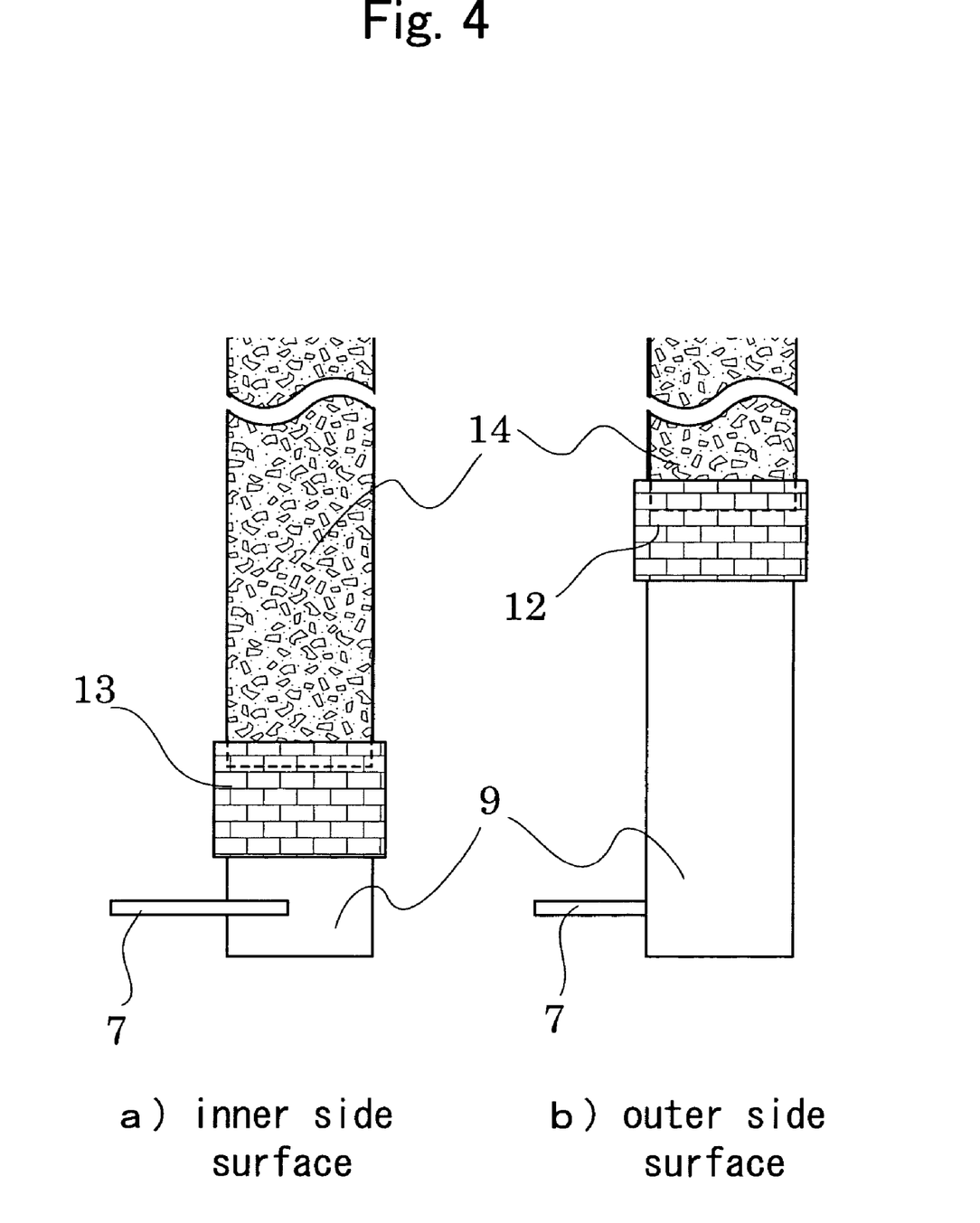
FIG. 4 is a view showing an example of an electrode provided with an insulation tape.

As shown in FIG. 4, the insulation member 13 is provided on the inner surface of the outermost portion of the positive electrode of the electrode body 1, and the insulation member 12 is provided on the outer surface of the another portion of the positive electrode immediately inside the portion of the negative electrode that is immediately inside the outermost portion of the positive electrode. Provided on the positive electrode substrate of the positive electrode 9 are a positive electrode active material 14 and a positive current collector tab 7, and provided on the negative electrode substrate of the negative electrode 10 are a negative electrode active material 15 and a negative current collector tab 8, as shown in FIG. 7.

Figure 9:
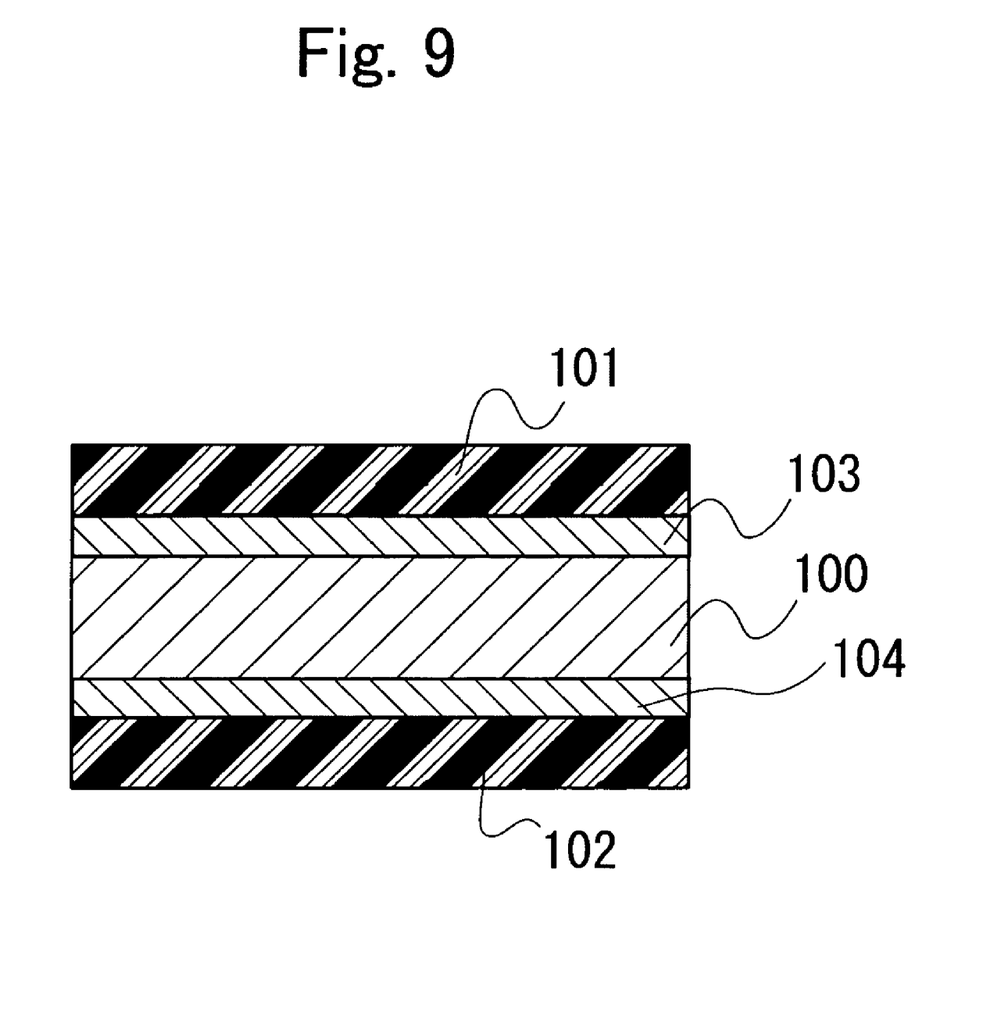
FIG. 9 is a view showing the sectional structure of an aluminum laminate film that constitutes the film outer casing body.

The aluminum laminate material, which constitutes the outer casing body 3, will be described referring to FIG. 9, which shows a section of the aluminum laminate material. As shown, the aluminum laminate material has a 20-μm-thick first polypropylene layer 101 (the polypropylene layer provided outwards) placed on one surface of a 20-μm-thick metal layer 100 made of aluminum, and has a 60-μm-thick second polypropylene layer 102 (the polypropylene layer provided inwards) placed on the other surface of the metal layer 100. The metal layer 100 and the first polypropylene layer 101 are adhered to each other via a dried laminate adhesive layer 103 of 5 μm thick, and the metal layer 100 and the second polypropylene layer 102 are adhered to each other via a 5-μm-thick carboxylic modified polypropylene layer 104 in which a carboxyl group is added to the polypropylene.

It will be readily appreciated that the outer casing body of the present invention will not be limited to the aluminum laminate material; for instance, the outer casing body may be made only of a resin film.

A method of preparing the lithium ion secondary cell of the above structure will be described.

Preparation of Positive Electrode

A positive electrode active material made of lithium cobalt oxide ($LiCoO_2$), a carbon-based conductivity enhancer made of acetylene black or graphite, and a binder made of polyvinylidene fluoride (PVdF) were prepared at a mass ratio of 90:5:5. These were dissolved and mixed in, for instance, an organic solvent made of N-methyl-2-pyrrolidone (NMP). Thus, a positive electrode active material slurry was prepared.

This positive electrode active material slurry was applied in a uniform thickness on both sides of a positive electrode substrate made of an aluminum foil of 59 mm wide (length of the shorter side of the substrate) and 725 mm long (length of the longer side of the substrate) by a die coater or a doctor blade.

The slurry was not applied on the end portion of the positive electrode substrate, that is, the end portion of the positive electrode substrate was exposed, as shown in FIG. 4.

This electrode plate was passed through a drier to remove the organic solvent, thus preparing a dried electrode plate with an application mass amount of 450 g/m$^2$. This dried electrode plate was rolled with a roll press machine to a thickness of 0.16 mm.

Then, an insulation member 12 and an insulation member 13 of 61 mm wide (length of the shorter side of the substrate) and 15 mm long (length of the longer side of the substrate) were provided on the appropriate places of the exposed portions of the positive electrode substrate so that at least one of the lower and upper edges of the first flat side surface R portion of the electrode body 1 would be completely covered, as shown in FIG. 4. The arrangement of the insulation members were such that both lower and upper edges of the insulation members 12 and 13 were beyond the shorter side of the substrate by 1 mm, and that the insulation member 12 covered part of the positive electrode active material 14.

The insulation member is an insulation tape made of glass materials or of resin selected from fluorocarbon resin, polyimide, liquid crystal polymer (LCP), polyphenylene sulfide (PPS), polybutylene terephthalate (PBT), polyethylene terephthalate (PET), polyethylene (PE), polypropylene (PP), polyvinyl chloride (PVC), and acetate resin. Examples of the fluorocarbon resin include polytetrafluoroethylene (PTFE), tetrafluoroethylene-hexafluoropropylene copolymer (FEP), tetrafluoroethylene-ethylene copolymer (ETFE), tetrafluoroethylene-perfluoroalkylvinylether copolymer (PFA), and polyvinylidene fluoride (PVDF). It should be noted, however, that the insulation member used herein is not limited to the above insulation tape insofar as the insulation member is highly stable with respect to the electrolyte and lithium ions. Alternatively, an insulation resin may be applied directly onto the substrate.

The insulation tape may be applied onto the substrate via an adhesive or tackiness agent made of styrene-butadiene rubber, carboxymethyl cellulose, polyvinylidene fluoride, or the like.

Other than lithium cobalt oxide ($LiCoO_2$), the positive electrode active material used in the lithium ion secondary cell of the present embodiment may be lithium nickel oxide ($LiNiO_2$), lithium manganese oxide ($LiMn_2O_4$), or lithium metal oxide ($LiFeO_2$). Also contemplated are lithium-containing transition metal compound oxides such as those oxides having part of the transition metals in the above-named oxides substituted with another element. These oxides may be used alone or in combination.

Preparation of Negative Electrode

A negative electrode active material made of an artificial graphite of a volume average particle diameter of 20 μm, a binder made of styrene-butadiene rubber, and a thickener made of carboxymethyl cellulose were prepared at a mass ratio of 98:1:1. These were mixed with a suitable amount of water. Thus, a negative electrode active material slurry was prepared.

This negative electrode active material slurry was applied in a uniform thickness on both sides of a negative electrode substrate made of a copper foil of 61 mm wide (length of the shorter side of the substrate) and 715 mm long (length of the longer side of the substrate) by a die coater or a doctor blade. The slurry was not applied on the end portion of the negative electrode substrate, that is, the end portion of the negative electrode substrate was exposed, as shown in FIG. 7. This electrode plate was passed through a drier to remove the moisture, thus preparing a dried electrode plate with an application mass amount of 200 g/m$^2$. This dried electrode plate was rolled with a roll press machine to a thickness of 0.14 mm.

The negative electrode active material used in the lithium ion secondary cell of the present embodiment may be natural graphite, carbon black, coke, glass carbon, carbon fiber, or carbonaceous substances such as calcined structures of the foregoing. Also contemplated is a mixture of the carbonaceous substance and one or more substance selected from lithium, lithium alloys, and metal oxides capable of intercalating and deintercalating lithium.

Preparation of Electrode Body

A positive current collector tab 7 made of aluminum was attached to the positive electrode 9, and a negative current collector tab 8 made of nickel was attached the negative electrode 10. To the attachment portions of the current collector tabs and the electrodes were provided current collector tab protection tapes 5 and 6 made of polyphenylene sulfide (PPS). The positive and negative electrodes and a finely porous separator made of olefin-based resin were wound together with a winding device as shown in FIGS. 3 and 7. An insulation winding-end tape 16 of 61 mm wide (length of the shorter side of the substrate) and 15 mm long (length of the longer side of the substrate) was provided on the outermost portion of the positive electrode that was in the second flat side surface R portion. Thus, the flat electrode body 1 was completed.

It will be readily appreciated that the materials for the current collector tab protection tapes and the separator are not particularly limited to those specified above. The requirements given for the insulation tape, which serves as the insulation member, also apply to the material for the winding-end tape, which may be any insulation material insofar as it is highly stable with respect to the electrolyte and lithium ions.

Preparation of Electrolyte Solution

A non-aqueous solvent in which ethylene carbonate (EC), propylene carbonate (PC), and diethyl carbonate (DEC) were mixed at a mass ratio of 1:1:8 (when under conditions of 1013 hPa and 25° C.) was prepared. Into this solvent was dissolved $LiPF_6$ serving as the electrolyte salt at 1 M (mole/liter), thus preparing an electrolyte solution. This solution was mixed with polyethylene glycol diacrylate (molecular amount: 1000) at a mass ratio of 9:1, and further, a polymerization initiator (t-hexyl peroxy pivalate) was added. Thus, a pre-gelled solution was prepared.

The non-aqueous solution used in the lithium ion secondary cell of the present embodiment is not limited to the combination specified above. For instance, the non-aqueous solution may be a mixture of a high-permittivity solvent in which the lithium salt is highly soluble and a low-viscose solvent. Examples of the high-permittivity solvent include ethylene carbonate, propylene carbonate, butylene carbonate, and γ-butyrolactone. Examples of the low-viscose solvent include diethyl carbonate, dimethyl carbonate, ethyl methyl carbonate, 1,2-dimethoxy ethane, tetrahydrofuran, anisole, 1, 4-dioxane, 4-methyl-2-pentanone, cyclohexanone, acetonitrile, propionitrile, dimethylformamide, sulfolane, methyl formate, ethyl formate, methyl acetate, ethyl acetate, propyl acetate, and ethyl propionate. The high-permittivity solvent and the low-viscose solvent each may be a mixture solvent of two or more of the respective above-named candidates.

Other than $LiPF_6$, the electrolyte salt may be $LiN(C_2F_5SO_2)_2$, $LiN(CF_3SO_2)_2$, $LiClO_4$, $LiBF_4$, or the like. These may be used alone or in combination.

Cell Preparation

The flat electrode body 1 and the pre-gelled solution were inserted into the storage space 2 of the aluminum laminate outer casing body 3 of the three-side-sealed structure, in which the folded portion of the folded film was the bottom portion and the other three sides were sealed. The opening portions of the outer casing body were then sealed and subjected to heat treatment so that the pre-gelled solution would be gelled. Thus, the lithium ion secondary cell of the present embodiment was completed.

Dropping Resistance Tests

Ten cells of Example and ten cells of Comparative Example below were prepared and dropped (10 times at most) from a height of 1.9 m, and a study was conducted as to how many times the cells were dropped before internal short-circuiting occurred (dropping impact resistance performance). The occurrence of short-circuiting was confirmed with a tester that checked the conduction between the current collector tabs.

EXAMPLE

Each cell of the present Example was a sealed cell using the film outer casing body of the above embodiment.

COMPARATIVE EXAMPLE

Each cell of Comparative Example was a sealed cell using the same film outer casing body as that of Example except that the insulation tape was not provided on the positive electrode (first electrode).

During the dropping resistance tests the ten specimens of Example had no short-circuiting, whereas the cells of Comparative Example did after 3.7 times of dropping on average.

The results indicate that cells using the film outer casing body of the present invention excel in the dropping impact resistance performance.

When a sealed cell using the film outer casing body receives a dropping impact or the like and the flat electrode body housed in the outer casing body is deformed, one of the corners portions (four corners) of the flat electrode body is severely deformed. The four corners of the flat electrode body correspond to the upper and lower edges of the two flat side surface R portions of the electrode body. The deformed flat side surface R portion breaks the separator and thus causes short-circuiting. As a result of studies conducted by the present inventors, it has been found that a portion of the first electrode wound to be the outermost surface of the electrode body is most severely deformed, and that the provision of the insulation member to cover the flat side surface R portion between the outermost portion of the first electrode and a portion of the second electrode wound immediately inside the outermost portion of the first electrode cannot not sufficiently improve the dropping impact resistance performance.

On the other hand, the structure of the present invention is as follows. The insulation member is provided between the outermost portion of the first electrode (positive electrode) and the portion of the second electrode (negative electrode) immediately inside the outermost portion of the first electrode, and between the portion of the second electrode and another portion of the first electrode immediately inside the portion of the second electrode in such a manner that at least one of lower or upper edges of the first flat side surface R portion of the electrode body is completely covered. This structure of the present invention prevents the contact between the outermost portion of the first electrode, which is most severely deformed, and the portion of the second electrode immediately inside the outermost portion of the first electrode, and also prevents the contact between the portion of the second electrode immediately inside the outermost portion of the first electrode and the another portion of the first electrode immediately inside the portion of the second electrode. Thus, the present invention significantly improves the dropping impact resistance performance of the sealed cell that uses the film outer casing body.

In the above embodiment, the insulation member covers the border of the active material and the exposed portion of the substrate. This prevents the detachment of the active material starting from the border and prevents short-circuiting caused by the separator which a detached piece of the active material breaks.

In the above embodiment, the exposed portion of the substrate of the first electrode extends to be the outermost surface of the electrode body that corresponds to the second flat side surface R portion, and the insulation member is provided to completely cover the second flat side surface R portion, as shown in FIG. 3. This structure securely prevents short-circuiting caused by the deformed edge of the second flat side surface R portion resulting from dropping impacts or the like.

The winding end of the first electrode is arranged in the second flat side surface R portion of the outermost surface of the electrode body, and the second insulation member is an insulation winding-end tape for taping the winding end of the electrode body. This reduces the number of members required in cell production.

The width (length of the shorter side) of the first electrode is designed to be smaller than that of the second electrode. With this structure, the tolerance encountered in preparing the substrate for the first electrode is smaller than that in preparing the substrate for the second electrode. By providing the insulation member on the first electrode, the portions of the electrodes corresponding to the edges of the flat side surface R portion are securely covered. As a result, there is an improved yield of cell production.

These structures described above significantly improve the dropping impact resistance performance of the sealed cell that uses the film outer casing body. Cells using the film outer casing body and having excellent dropping impact resistance performance are highly applicable to the power sources for mobile electronic devices such as mobile telephones and PDAs.

Supplementary Remarks

1) It will be readily appreciated that the first electrode may be the negative electrode and the second electrode may be the positive electrode, in which case similar dropping impact resistance performance to that in the above embodiment is obtained.

Figure 5:
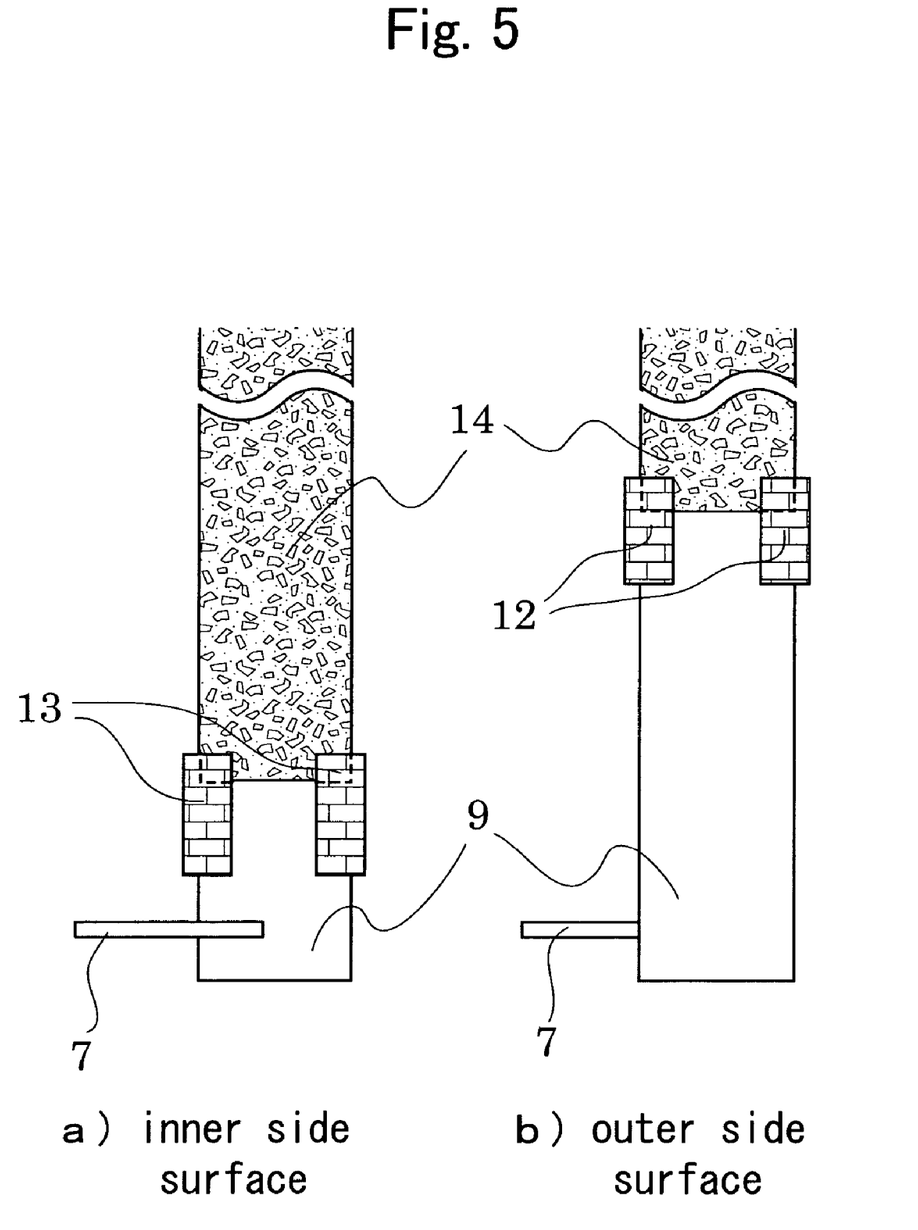
FIG. 5 is a view showing another example of an electrode provided with an insulation tape.
Figure 6:
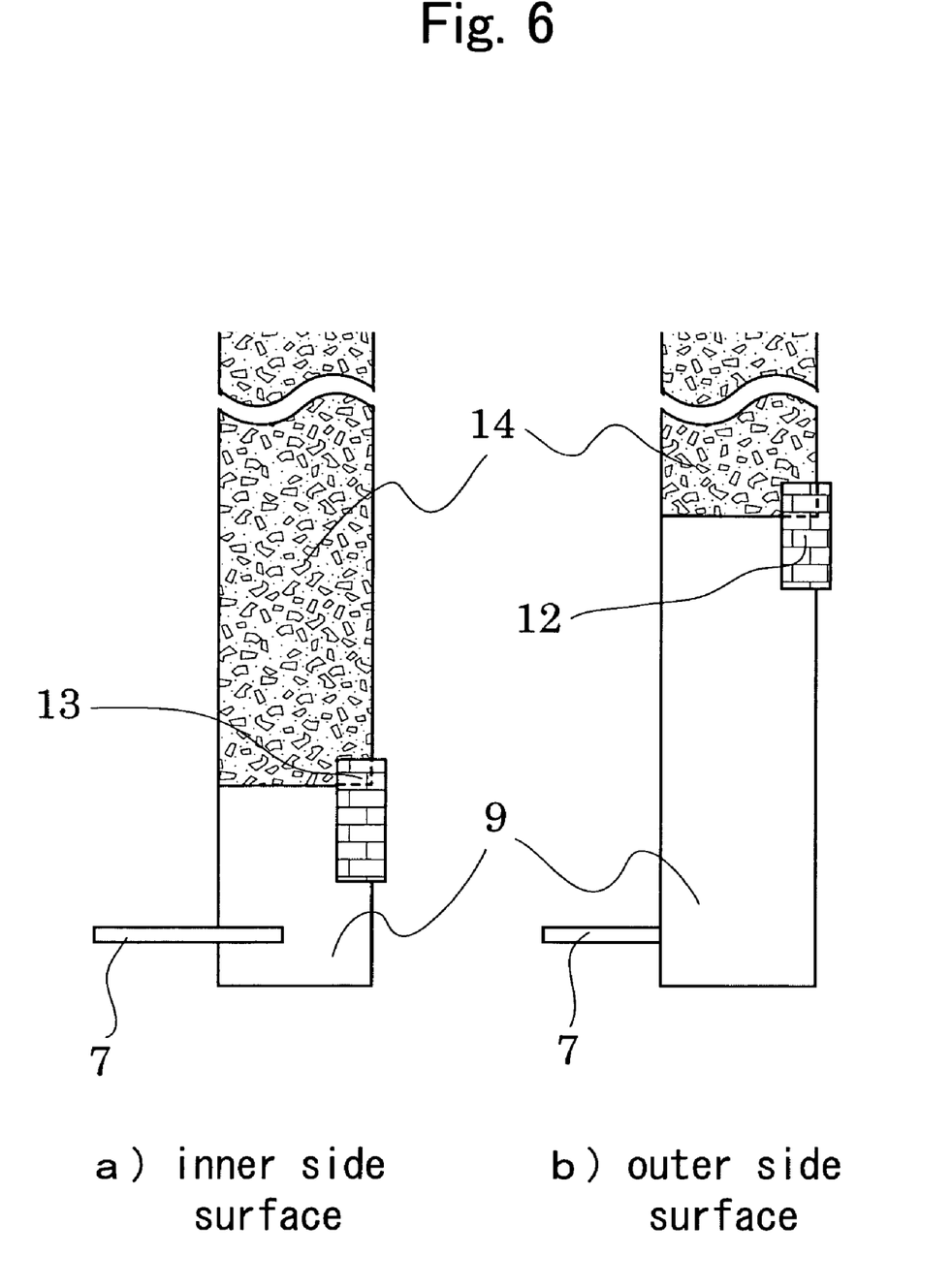
FIG. 6 is a view showing another example of an electrode provided with an insulation tape.

2) The provision of the insulation member only needs to be on at least one of the corners of the electrode body, in improving the dropping impact resistance performance of the sealed cell. In other words, the insulation member need not be provided in the middle portion of the flat side surface R portion, as shown in FIGS. 5 and 6.

When providing the insulation tape to completely cover the flat side surface R portion including the middle portion thereof, it is preferable that one insulation tape completely cover the both lower and upper edges of one surface of the flat side surface R portion. This simplifies the cell production process, compared with providing one tape per each edge, which requires two insulation tapes.

When the outer casing body is of the three-side-sealed structure, in which the folded portion of the folded film is the bottom portion and the other three sides are sealed, then the bottom portion is particularly severely deformed by dropping impacts or the like. In view of this, the insulation member is preferably provided on the edge of the flat side surface R portion at the side of the bottom portion of the outer casing body, as shown in FIGS. 5 and 6.

Figure 8:
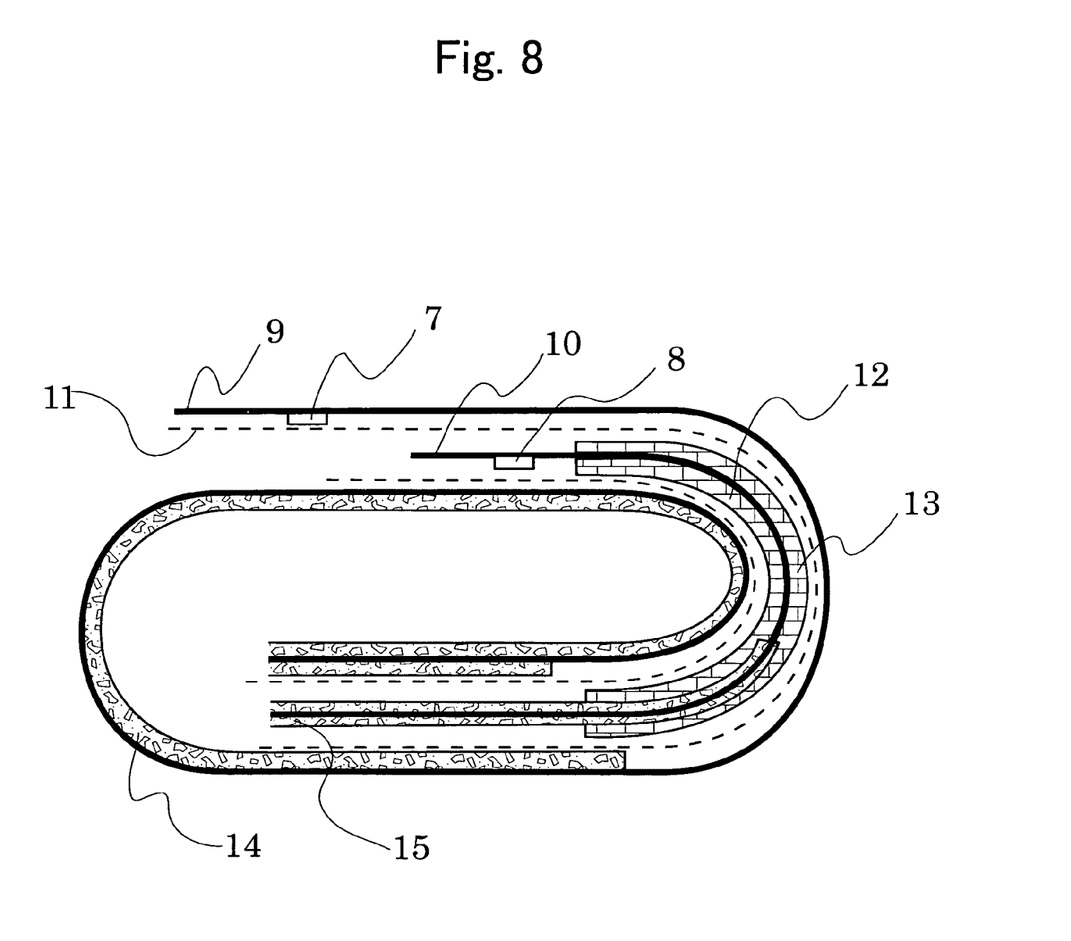
FIG. 8 is a sectional view of another example of the electrode body of the present invention.

3) The present invention is not to be limited by the above embodiment. For instance, the inner surface of the portion of the second electrode (negative electrode) immediately inside the outermost portion of the first electrode (positive electrode) may be provided with the insulation member 12, and the outer surface of the portion of the second electrode may be provided with the insulation member 13, as shown in FIG. 8.

What is claimed is:

1. A sealed cell using a film outer casing body comprising:
    a flat-shaped electrode body having a first electrode and a second electrode opposed to the first electrode via a separator, the first electrode and the second electrode and the separator wound into a flat shape, the flat shape having a first flat side surface R portion and a second flat side surface R portion;
    the film outer casing body for housing the flat-shaped electrode body; and
    an electrolyte, the sealed cell wherein:
    a portion of the first electrode is an outermost surface of the flat-shaped electrode body; and
    a first insulation member covering a lower edge and/or an upper edge of the first flat side surface R portion is provided between the outermost portion of the first electrode and a portion of the second electrode wound immediately inside the outermost portion of the first electrode, and another first insulation member covering a lower edge and/or an upper edge of the first flat side surface R portion is provided between the portion of the second electrode immediately inside the outermost portion of the first electrode and another portion of the first electrode wound immediately inside the portion of the second electrode immediately inside the outermost portion of the first electrode.

2. The sealed cell according to claim 1, wherein:
    the film outer casing body comprises a flat-shaped three-side-sealed structure composed of a square aluminum laminate film, the square aluminum laminate film folded and three sides of the folded aluminum laminate film sealed, the aluminum laminate film being a lamination of an aluminum layer and a resin layer; and
    the lower edge of the first flat side surface R portion is arranged in a bottom portion of the film outer casing body, the lower edge alone provided with the first insulation members.

3. The sealed cell according to claim 1, wherein:
    the first electrode is smaller than the second electrode in width; and
    the first insulation member is provided on an inner surface of the outermost portion of the first electrode, and the another first insulation member is provided on an outer surface of the another portion of the first electrode immediately inside the portion of the second electrode immediately inside the outermost portion of the first electrode.

4. The sealed cell according to claim 1, wherein the first insulation member and the another first insulation member are provided so as to completely cover each entire area of the first flat side surface R portion.

5. The sealed cell according to claim 1, wherein a second insulation member is provided on the outermost portion of the first electrode, the second insulation member completely covering the second flat side surface R portion.

6. The sealed cell according to claim 5, wherein:
    a winding end of the first electrode is arranged in the second flat side surface R portion in the outermost surface of the electrode body; and
    the second insulation member is an insulation winding-end tape for taping a winding end of the electrode body.

7. The sealed cell according to claim 1 wherein:
    the first insulation member and the another first insulation member completely cover the lower edge and/or the upper edge of the first flat side surface R portion respectively, protruding beyond the lower edge and/or the upper edge of the first flat side surface R portion.

8. The sealed cell according to claim 4 wherein:
    the first insulation member and the another first insulation member completely cover the entire area of the first flat side surface R portion, protruding beyond the lower edge and/or the upper edge of the first flat side surface R portion.

9. The sealed cell according to claim 5 wherein:
    the first insulation member and the another first insulation member completely cover the entire area of the first flat side surface R portion, protruding beyond the lower edge and/or the upper edge of the first flat side surface R portion.

* * * * *